Oct. 9, 1945.  F. Y. PEARNE ET AL  2,386,341
MACHINE FOR CUTTING OBJECTS
Filed April 14, 1943  3 Sheets-Sheet 1

INVENTORS
FRANK Y. PEARNE,
BY JOHN D. ROSSIER,
ATTORNEY.

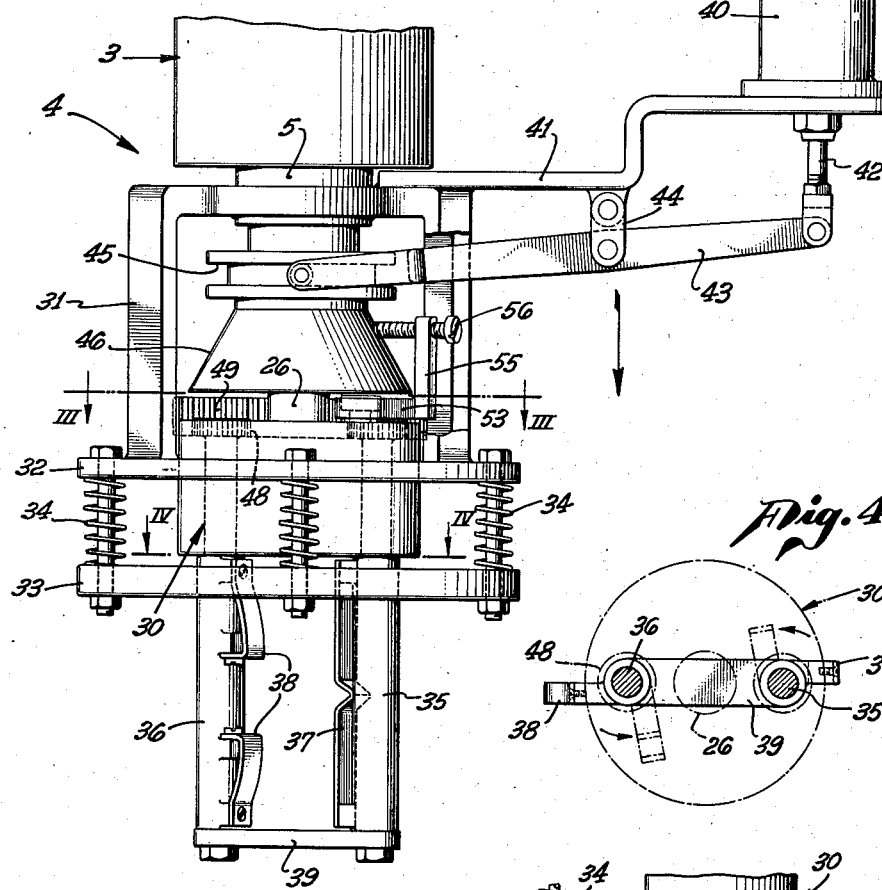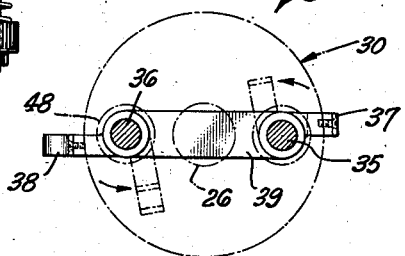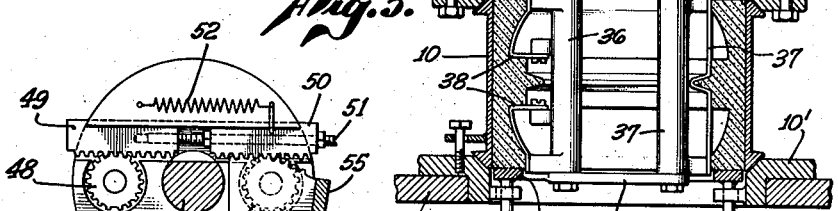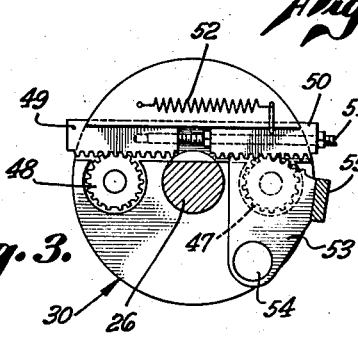

Patented Oct. 9, 1945

2,386,341

UNITED STATES PATENT OFFICE 2,386,341

MACHINE FOR CUTTING OBJECTS

Frank Y. Pearne, Alhambra, and John D. Rossier, Downey, Calif., assignors to Pacific Clay Products, Los Angeles, Calif., a corporation of California Application April 14, 1943, Serial No. 483,079

14 Claims. (Cl. 25—109)

The present invention is directed to a machine for cutting on various objects, particularly for cutting on the internal surfaces of hollow cylindrical objects. In its most specific embodiment, described hereinafter in detail as an illustration, the machine is particularly adapted to carve or cut various ridges, lips and flanges on the internal surfaces of hollow, clay composition cylinders to form collars therefrom. The invention also pertains to novel pressure fluid control systems for regulating the various operations, such as automatically feeding objects to a reciprocating cutting arm provided with a rotary cutting head carrying cutters movable into and out of cutting position. Means have also been provided in the machine of this invention for regulating the speed at which the various operations are carried out, for controlling the pressure with which the cutters engage the cylinders being cut and for timing the various movements so as to prevent accidental breakage of some of the delicate parts of the machine.

Although the pressure fluid or hydraulic system embodied in the machine of this invention is adapted for use in other boring, turning and milling machines, it will be particularly described as applied to a machine for forming clay collars of the type disclosed in United States Letters Patent No. 2,313,074 issued to Howard W. Jewell.

The machine of the present invention is designed to take cylindrical pieces of clay and automatically carve suitable flanges and ridges on the inner surfaces of the clay cylinders. The clay cylinders fed to the machine may vary somewhat in consistency or hardness and hydraulic means are provided for regulating the speed at which the cutters move into cutting position and for relieving the cutting pressure in the event a cylinder of unusual hardness or resistance is fed to the machine. Moreover, the machine includes means for automatically feeding the cylinders and for raising and lowering the cutting head in timed relation to the feeding mechanism. Preferably, a unitary, interconnecting pressure fluid system is used for raising and lowering the cutting head, moving the cutters into and out of cutting position, driving the feeding table, locking it in position during a cutting operation, etc., these various operations taking place in precise timed relation. Regulatable orifice means positioned in the hydraulic system, together with pressure release valves set for appropriately differing pressures, are used in suitably timing the various operations even though but a single source of pressure fluid is employed.

An object of the present invention, therefore, is to disclose and provide an automatic machine whereby cutting operations may be systematically and accurately carried out on various objects supplied to the machine.

A further object of the invention is to disclose and provide an hydraulically energized machine for cutting on the inner surfaces of clay cylinders.

A further object of the invention is to disclose and provide a machine including a reciprocating head frame provided with a rotatable cutter head, the cutter head carrying cutting knives movable into and out of cutting position.

A still further object is to disclose and provide a pressure fluid system whereby a plurality of different movements and operations may be serially carried out in suitably timed relation to each other.

These and other objects, uses, adaptations and modifications of the invention will become apparent to those skilled in the art from the description given hereinafter. In order to facilitate understanding, the description will be directed to an exemplary form of machine specifically designed to perform cutting operations on the internal surfaces of hollow, unburned clay composition cylinders.

In the appended drawings:

Fig. 2 is an enlarged front view of the head frame and cutter head carried thereby.

Fig. 3 is a horizontal section taken along the plane III—III of Fig. 2.

Fig. 4 is a horizontal section taken along the plane IV—IV of Fig. 2.

Fig. 5 is a vertical section through a collar with the cutters in final cutting position.

Figure 1:
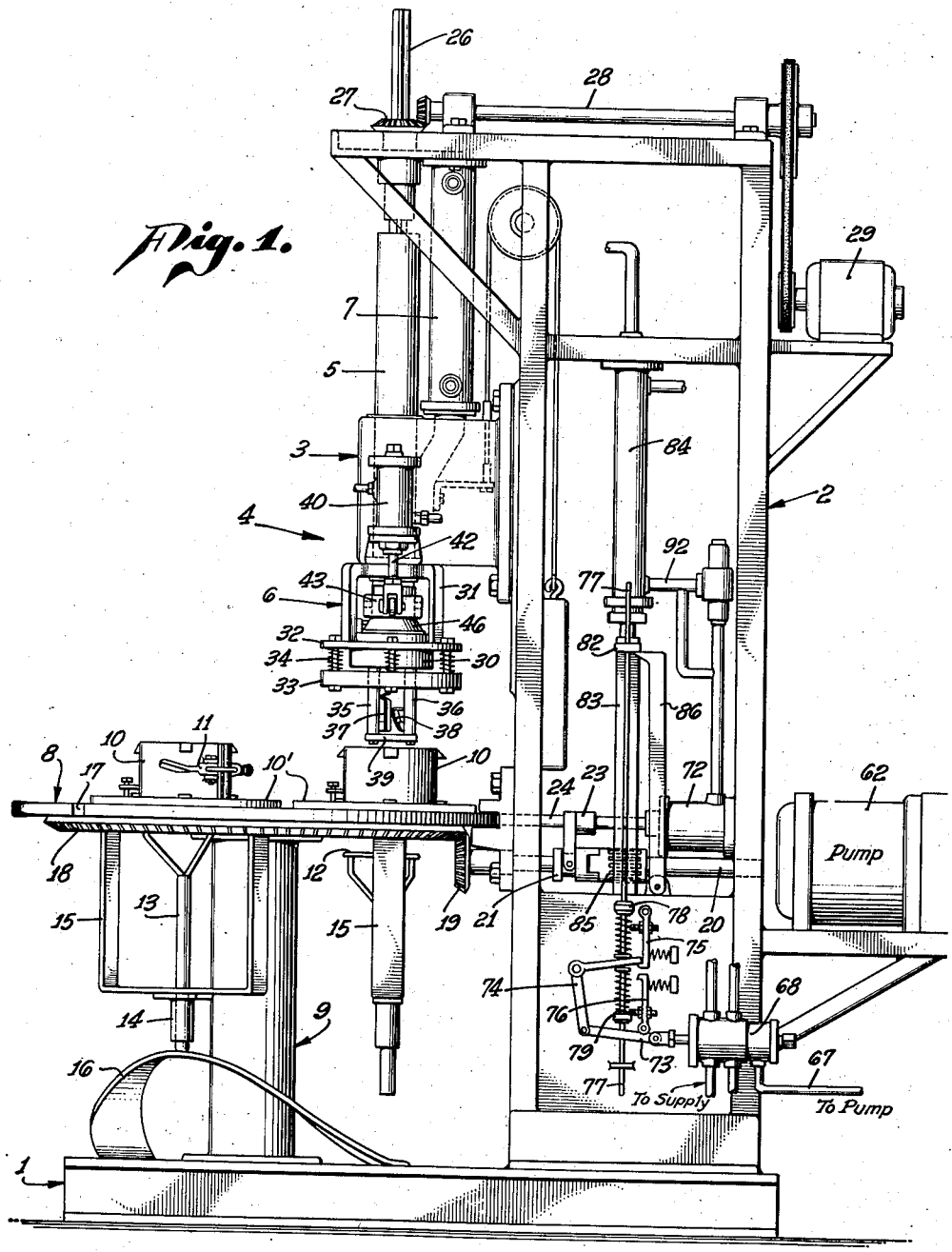
Fig. 1 is a side elevation of the machine showing the major elements thereof, much of the piping of the hydraulic system being left out of this figure in order to simplify the same.

As shown in Fig. 1, the machine comprises a base 1 provided with a vertical framework 2 on which there is mounted a head guide 3 adapted to slidably receive a vertically movable tubular member 5 carrying at its lower end the cage 6. The tubular member 5 is connected to a piston within a pressure fluid cylinder 7 adapted to move the cage downwardly and upwardly. Positioned beneath the head guide 3 is a rotary feeding table 8 mounted for rotation about a vertical pedestal 9 carried by the base 1.

The feeding table 8 is provided with a plurality of ports, each being adapted to receive a split holder 10 carrying a locking means 11. These holders carry hollow clay cylinders. Within each port of the feeding table 8 is an adapter ring 10' (Fig. 5) provided with a tapered seat capable of receiving the bottom of the holder 10. Outstanding lugs carried by the holder 10 may cooperate with upstanding pins in the adapter for the purpose of preventing relative rotation. Within the adapter 10' is an annular ring 12 restrained from downward movement by inwardly extending lugs carried by the adapter. The ring 12 may be called an extractor and is supported by the upper branches of rod 13 slidably mounted in a bearing 14 attached to the table 8 by means of a frame 15. Below the feeding table 8 is an inclined cam surface 16 adapted to engage the bottom of the rod 13 so as to cause the extractor 12 to be pressed against the bottom of the clay cylinder within the holder 10 and to force the cylinder out of the holder at a predetermined stage in the operation.

The edge portion of the rotary table 8 may be provided with a plurality of latching notches, such as the notch 17, said notches being equal in number to the number of holders 10 carried by the table 8. The peripheral and lower edge portion of the feeding table 8 may also be provided with a gear 18 in engagement with a mitre gear 19 carried by a shaft 20 suitably journaled in the main frame 2 of the machine. The shaft 20 may also carry a slidably keyed clutch 21 and a loose pinion gear, the pinion gear being in engagement with a vertical rack 83. The movable member of the clutch 21 may be actuated by means of a lever 23 carried by the locking rod 24 which is adapted to engage the locking notches 17 of the table 8.

A driven keyed shaft 26 freely rotatable within the tubular member 5 is provided with a slidably keyed mitre gear 27 journaled in suitable bearings carried by the main frame 2. The shaft 26 is driven by suitable gearing and countershaft 28 from a motor 29 (Fig. 1). The shaft 26 extends below the tubular member 5 and is attached to a rotatable cutter head 30 which rotates within the frame 31 of cage 6 firmly attached to the vertically movable tubular member 5. The frame 31 of cage 6 is provided with an outwardly extending flange 32 from which depends an annular pressure ring 33 yieldably urged away from the flange 32 by means of springs 34. The pressure ring 33 and its lower tapered seat, is adapted to center and press downwardly against the holders 10 during the cutting operation.

A pair of cutter posts 35 and 36 are carried by the cutter head 30 and extend downwardly therefrom in parallel relation. These cutter posts 35 and 36 are spaced from the axis of rotation of the cutter head 30 and are rotatable with respect to the cutter head 30. Each of the cutter posts is provided with removable cutters or knives, such as the knives 37 and 38 so that these knives may be moved into and out of cutting position as best indicated in Fig. 4, wherein the position of the cutters when in cutting position is indicated in full lines and the position in the withdrawn or non-cutting position is indicated in dotted lines. The lower ends of the cutter posts 35 and 36 are preferably joined together by means of a link 39.

Means are provided for imparting a regulated partial rotation to the cutter posts 35 and 36. Such means may include a pressure fluid cylinder 40 carried by an arm 41 attached to the vertically movable cage 31. The rod 42 of the piston slidably mounted within the cylinder 40 is attached to a yoke lever 43 pivoted at 44, such yoke lever engaging a circumferential groove 45 of a cone 46 movable along the axis of rotation of the shaft 26. Vertical motion of the cone 46 is then translated into partial rotation of the cutter posts 35 and 36 by the following means: the upper end of each of the cutter posts 35 and 36 is provided with a pinion gear, such as the pinions 47 and 48. These pinion gears engage a rack gear slidably movable in a slot formed in the cutter head 30, the rack gear being preferably made of two parts 49 and 50 adjustably held together by means of a threaded bolt and lock nuts, generally indicated at 51. A spring 52 attached to the rack gear ordinarily maintains the cutter posts in withdrawn or non-cutting position.

A segment gear 53 pivoted to the upper surface of the cutter head 30 at 54 also engages the rack gear. The segment gear 53 is provided with a post 55 carrying an adjustable ball-ended contact 56 adapted to slidably contact the inclined surface of the cone 46. Upward movement of the cone 46 along the axis of rotation of the cutter head 30 is translated into a pivoted movement of the segment 53 which causes the rack 50 to travel, thereby partially rotating the cutter posts 35 and 36. These operations can be carried out during rotation of the entire cutter head.

In operation, preloaded holders 10 are placed upon the feeding table 8 and the machine automatically moves the loaded holders under the vertically reciprocating head frame 4. The head frame is then automatically lowered, the cutter bars are automatically swung outwardly into cutting position, then collapsed at the completion of the cut, and the head frame is raised, whereupon the feeding table is again intermittently driven to present a new holder to the action of the head frame and cutter head covered thereby. The automatic accomplishment of these various operations in suitably timed relation and with proper safeguards to the successful completion of each task, may be best understood from a consideration of the fluid pressure control system diagrammatically represented in Fig. 6.

In the pressure fluid or hydraulic system to be described, a supply of liquid, preferably oil, is indicated at 60. Oil from this reservoir is supplied as by line 61 to a suitable pressure pump 62 having a discharge line 63. A recirculating by-pass, including line 64, valve 65 and line 66, is provided so that when valve 65 is open, the pump 62 discharges through the lines 63, 64 and 66 back into the intake line of the pump. If, however, the valve 65 is closed, then the oil discharged by the pump 62 will pass through line 67 into a reversing valve 68 capable of discharging oil either through line 70 or line 71. The reversing valve 68 is connected to a timing valve 72, the piston in valve 72 being preferably connected to the rod 24 which engages the feeding table and actuates the clutch 21.

The piston which is movable within the reversing valve 68 is connected as by means of a link 73 with a bell crank lever 74. The bell crank lever 74 may assume two lock or latch positions. One arm of the bell crank lever is shown in a position engaged by the latch 75 but a lower latch 76 is also provided. A vertically extending control rod 77 is provided, such control rod carrying a pair of stops 78 and 79 adapted to disengage the latches 75 and 76 respectively. The control rod 77 also carries a pair of stops 80 and 81 capable of being engaged by a lug 82 extending from a rack gear 83 attached to or actuated by the piston within the hydraulic cylinder 84. The rack gear 83 is in engagement with a pinion 85 mounted upon the shaft 20 which drives the gear 19 and the table 8. Adjacent this control rod 77 and rack 83 is a lock bar 86 yieldably urged toward the lug 82 of the rack so as to engage the under side of such lug and hold the rack against downward movement. The lock bar 86 may be released automatically by the piston rod 24 when such rod is moved out of engagement with the feeding table 8 through an adjustable stop pin 87 carried by the piston rod 24.

Figure 6:
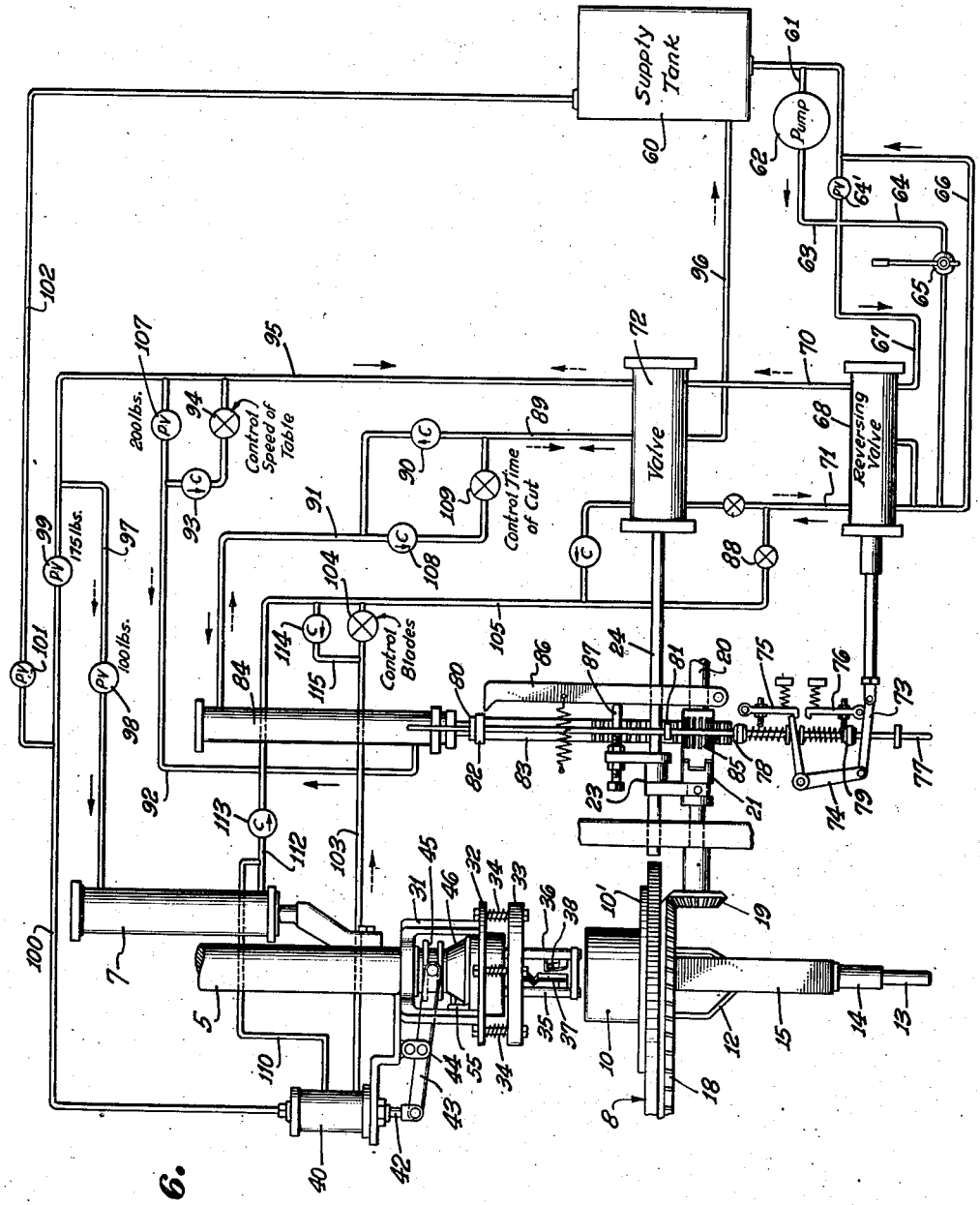
Fig. 6 is a schematic representation of the head frame, feeding table and pressure fluid system for controlling the various operations.

Fig. 6 shows that stage in the operations where the head frame has been raised and the feeding table 8 has been unlatched by the bar 24, the clutch 21 having been engaged simultaneously and the locking bar 86 released, thereby permitting downward movement of the rack 83. At that point in the operations, incoming pressure oil is being discharged by reversing valve 68 through line 71 and passes into the timing valve 72.

Oil is now discharged from the valve 72 by line 89 and a check valve 90 into line 91 which thereby supplies pressure fluid to the upper end of the actuating cylinder 84. Downward movement of the piston in the cylinder is thus initiated, thereby moving rack 83 downwardly and causing rotation of shaft 20, gear 19 and its interconnected feeding table 8. The length of travel of the rack 83 required to move the table 8 the distance from one port to another is controlled by the rack lug 82 and collar 81 on the control rod 77 which operates the reversing valve 68.

Dead oil from the lower part of cylinder 84 is discharged by line 92 through a check valve 93 and a control or orifice valve 94 into a return line 95 which leads to timing valve 72, this valve now discharging through line 96 which returns the oil to the supply tank or reservoir 60. It is to be noted that the downward movement of the rack 83 and therefore the speed of rotation of the feeding table 8 is controlled by regulating the admission of pressure fluid into this portion of the system as well as the back pressure or discharge of dead oil from the system.

The discharge of dead oil from the system is controlled by the orifice valve 94. Very fine adjustments can thus be made and by setting the valves, the timing operation is controlled perfectly.

The downward movement of the rack 83 is continued until the lug 82 strikes the lower stop 81 on the control rod 77. The control rod is then moved downwardly so as to cause the release stop 78 to release the latch 75, thereby causing the bell crank 74 to be pivotally moved so as to actuate the reversing valve 68. The bell crank lever 74 is held in its lower position by the latch 76. When the reversing valve 68 is in such reversed position (opposed to that shown in Fig. 6) pressure fluid is discharged from the valve 68 by line 70 into the piston valve 72 which advances the piston rod and locking bar 24 into locking engagement with a notch in the feeding table 8. At the same time, the clutch 21 is disengaged and the stop 87 is withdrawn so as to permit the locking bar 86 to move into a position capable of arresting and engaging lug 82 when it reaches the top of the stroke.

When the feeding table is locked in the manner described, pressure fluid is discharged by piston valve 72 through line 95 and takes the path of least resistance through line 97 and pressure release valve 98 into the upper end of cylinder 7, thereby initiating the downward movement of the member 5 and its appurtenances.

When the piston in cylinder 7 stops its downward motion or comes to the end of its stroke, the presure in lines 97 and 95 is automatically increased since no further quantity of oil may flow into the cylinder 7. The pressure fluid will then take the next available line of least resistance and pass through pressure release valve 99 positioned in line 100, by means of which the pressure fluid is supplied to the top of the cone-actuating cylinder 40, which causes the cone 46 to move upwardly.

It is to be noted that the piston in cylinder 40 is not actuated until the head frame has reached the lowest point in its travel.

Downward movement of the piston in cylinder 40 is translated into outward movement of the cutters on the cutting posts 35 and 36. In the event the cutters meet an unusually resistant collar, the pressure in line 100 will exceed a certain predetermined value and in order to prevent the cutters from breaking, bending or injuring the collar, this excess pressure developed in line 100 is released through valve 101 positioned in a by-pass line 102 which connects line 100 with the reservoir 60. The by-pass line 102 is connected to line 100 at a point between the cylinder 40 and the pressure release valve 99. The pressure release valves 98, 99 and 101 are adapted to permit the flow of pressure fluid at progressively increasing pressures in the order stated.

During downward movement of the piston in cone-actuating cylinder 40, dead oil is discharged through line 103 and passes through a choke valve 104 into line 105 which connects with the discharge line 71 which in turn is now associated with the return line 66. The rapidity with which the cutters are moved outwardly is therefore controlled in large part by the valve 104.

While the cutters on posts 35 and 36 are moving outwardly and the cone 46 is moving upwardly, the pressure in line 95 has increased to an extent sufficient to flow through a pressure relief valve 107 which permits the pressure fluid to flow into line 92 connected with the bottom of cylinder 84. In this manner the piston in cylinder 84 is slowly raised while the cutters are moving outwardly and during their cutting operation. The upward movement of the piston in cylinder 84 causes the rack 83 to travel upwardly until the lug 82 on the rack slips past the edge of lock bar or safety latch 86. Dead oil from cylinder 84 is discharged by line 91 through a check valve 108 and an adjustable orifice valve 109, and then into lines 89 and 96, back into the reservoir 60. The rate of upward movement of the rack 83 is therefore controlled by the valve 109 which acts as a regulatable choke upon the dead oil in line 91 and regulates the cutting time of the cutters.

It is to be understood that as the rack 83 is approaching the top of its stroke it engages the stop 80 carried by the control rod 77 and lifts the control rod sufficiently to permit the release stop 79 to release the latch 76, causing the bell crank lever 74 to move into the position shown in Fig. 6, thereby actuating the reversing valve 68. In the position shown, fresh oil is discharged from reversing valve 68 by line 71.

One of the characteristic features of the present invention lies in the provision of an interconnected pressure fluid system supplied by a single pump, such as 62, and so arranged that the various operations are performed in precisely timed relation. The pump 62 is capable of generating considerable pressure and the sequence of operations is to some extent at least, determined by a plurality of pressure relief valves, such as the valves 98, 99, 101 and 107 which open in sequence, depending upon the pressure of the fluid. The maximum pressure will not be generated as long as there is an outlet for the fluid. Moreover, it is to be noted that the line 91 acts both as a supply line to the top of cylinder 84 and as a discharge line from the top of cylinder 84. Check valves 90 and 108 are so arranged that when pressure fluid is being supplied to the top of cylinder 84, the fluid can not pass through choke or control valve 109 because of the check valve 108 and therefore will only pass through the check valve 90. When, however, fluid is being discharged from the top of cylinder 84 by line 91, it can not flow through check valve 90 but will pass through valves 108 and 109.

When valves in the machine are choked off, fluid at high pressure is by-passed by pressure relief valve 64' from line 63 back into tank 60 or line 61.

It may also be noted that when the piston in the cone-actuating cylinder 40 is raised, oil is discharged from the cylinder 40 by line 110 into line 112, which is associated with the bottom of cylinder 7, so that the upward movement of the head cutter does not take place until the cone 46 has been dropped and the cutters rotated out of cutting position. Pressure fluid supplied by line 105 does not pass into line 112 because of the check valve 113, the path of least resistance being through check valve 114 in line 115 connecting line 105 with line 103. In this manner, means have been provided for making certain that the cutter head is not withdrawn from the holder 10 in which the cutting operation is conducted, until the cutters have been rotated out of cutting position.

The operation of the machine described hereinabove will be readily understood. The machine and arrangements disclosed herein are not only adapted for use in cutting clay collars, but may be used in boring, turning, milling and routing operations on various objects. The pressure fluid controls disclosed herein may be employed wherever a plurality of hydraulic cylinders is used for the performance of interrelated operations or movements. Cylinder 84 may be used not only for imparting an intermittent drive but may also be termed a control cylinder. The pressures at which the various pressure relief valves are set depend somewhat upon the work being done, the power which the fluid pressure cylinders need generate and the pressure output of the pump used. In the specific illustration given, pressure release valve 98 may be set for 100 pounds, valve 99 for 175 pounds and valve 101 for 100 pounds. The pressure release valve 107 may be set for 200 or 250 pounds. These pressures are, of course, simply indicative of the order and may vary considerably.

The precise construction and arrangement of the feeding table or of the holders 10 carried thereby is not given in detail since the clamping of work-holding means may vary, depending upon the type of work being done, the size of the object upon which the contour or boring is being performed, etc. Nor is the present invention limited to the precise type of cutter head shown since in its broader aspects the invention may be employed with various other types of cutter heads.

All changes and modifications coming within the scope of the appended claims are embraced thereby.

We claim:

1. A machine for cutting contours on internal surfaces of hollow cylindrical objects comprising: a vertically reciprocable sleeve frame, a rotatable cutter head carried by the sleeve frame, a pair of downwardly extending cutter posts mounted on the cutter head in parallel relation and spaced from the axis of rotation of the cutter head, a cutter carried on each of said posts, and means for partially rotating the cutter posts to move the cutters into and out of cutting position during rotation of the cutter head.

2. A machine of the character described in claim 1 in which the means for partially rotating the cutter posts include a cone movable along the axis of rotation of the cutter head, and means for translating movement of said cone into partial rotation of said cutter posts.

3. A machine of the character defined in claim 1 in which the means for partially rotating the cutter posts include an element movable along the axis of rotation of the cutter head, fluid pressure means for controlling the movement of said element, and means for translating axial movement of the element into partial rotation of the cutter posts.

4. A machine for cutting contours on internal surfaces of hollow cylindrical objects comprising: a vertically reciprocable cage, a rotatable cutter head carried by the cage, a pair of downwardly extending cutter posts mounted on the cutter head for rotation therewith, said posts being in parallel relation and spaced from the axis of rotation of the cutter head, a cutter carried on each of said posts, means for rotating the cutter head during reciprocation of the head frame, fluid pressure means for partially rotating cutter posts to move the cutters into and out of cutting position during rotation of the cutter head, and fluid pressure means for raising and lowering the cage.

5. A machine of the character defined in claim 4 including an interconnected pressure fluid system for said fluid pressure means, whereby the cutter posts are not partially rotated into cutting position until the cage is lowered.

6. A machine of the character defined in claim 4 including a single source of fluid pressure connected to said fluid pressure means, and a pressure release valve between said source and each of said means, said release valves being serially responsive to fluid pressure from said source.

7. A machine for cutting contours on internal surfaces of hollow cylindrical objects comprising: a vertically reciprocable cage, a rotatable cutter head carried by the cage, a pair of downwardly extending cutter posts mounted on the cutter head in parallel relation and spaced from the axis of rotation of the cutter head, a cutter carried on each of said posts; pressure fluid cylinder means for partially rotating the cutter posts about their individual axes to move the cutters into and out of cutting position during rotation of the cutter head and posts mounted thereon about the axis of rotation of the cutter head, and a pressure fluid cylinder means for raising and lowering the cage.

8. In a machine of the character defined in claim 7, a common pressure fluid system for raising and lowering the cage and partially rotating the cutter posts in timed relation.

9. A machine including a vertically reciprocable cage, a cutting head carried by the cage, cutters on the cutting head, said cutters being adapted to move into and out of cutting position, hydraulic cylinder means for moving the cage and separate hydraulic cylinder means for moving the cutters, a single source of fluid pressure connected to both the hydraulic cylinder means, and a pressure release valve between said source and each of said cylinders, said release valves being serially responsive to fluid pressure from said source.

10. In a machine of the character described, a vertically reciprocable head frame, a rotatable cutter head carried by the head frame, a pair of downwardly extending cutter posts mounted on the cutter head for rotation therewith, said posts being in parallel relation and spaced from the axis of rotation of the cutter head, a cutter carried on each of said posts, hydraulically energized means for controllably moving the cutters into and out of cutting position during rotation of the cutter head, said means including a cylinder and a piston movably positioned therein, and regulatable orifice means associated with the discharge port of said cylinder for regulating the speed of movement of the piston therein and of the cutters actuated thereby.

11. In a machine of the character defined in claim 10, the provision of means, effective when cutting pressure on the cutters exceeds a predetermined amount, for discontinuing the outward movement of the cutters.

12. In a machine of the character described, rotatable cutter posts, cutters carried thereby, hydraulically energized means for moving the cutters outwardly into cutting position, means for supplying pressure fluid to said hydraulically energized means, and means, effective when the cutters encounter excessive resistance, for relieving pressure in said hydraulically energized means.

13. A machine for cutting contours on internal surfaces of hollow cylindrical objects comprising: a vertically reciprocable sleeve frame, a rotatable cutter head carried by the sleeve frame, a pair of downwardly extending cutter posts mounted on the cutter head for rotation therewith, said cutter posts being in parallel relation and spaced from the axis of rotation of the cutter head, a cutter carried on each of said posts, and means for partially rotating the cutter posts to move the cutters into and out of cutting position during rotation of the cutter head, said means including a cone movable along the axis of rotation of the cutter head, and means for translating movement of said cone into partial rotation of said cutter posts.

14. A machine for cutting contours on internal surfaces of hollow cylindrical objects comprising: a vertically reciprocable sleeve frame, a rotatable cutter head carried by the sleeve frame, a pair of downwardly extending cutter posts mounted on the cutter head for rotation therewith, said cutter posts being in parallel relation and spaced from the axis of rotation of the cutter head, a cutter carried on each of said posts, and means for partially rotating the cutter posts to move the cutters into and out of cutting position during rotation of the cutter head, said means including an element movable along the axis of rotation of the cutter head, fluid pressure means for controlling the movement of said element, and means for translating axial movement of the element into partial rotation of the cutter posts.

FRANK Y. PEARNE.
JOHN D. ROSSIER.